May 20, 1941.   J. A. SCHUTTLOFFEL ET AL   2,242,982
MANURE LOADER
Filed Oct. 20, 1939   2 Sheets-Sheet 1

INVENTOR.
John A. Schuttloffel
Edward J. Schuttloffel
BY Sam J. Slotsky
ATTORNEY.

May 20, 1941.  J. A. SCHUTTLOFFEL ET AL  2,242,982
MANURE LOADER
Filed Oct. 20, 1939  2 Sheets-Sheet 2

INVENTORS
John A. Schuttloffel
Edward J. Schuttloffel
BY Sam J. Slotsky
ATTORNEY.

Patented May 20, 1941

2,242,982

UNITED STATES PATENT OFFICE 2,242,982

MANURE LOADER

John A. Schuttloffel and Edward J. Schuttloffel, Larchwood, Iowa

Application October 20, 1939, Serial No. 300,412

3 Claims. (Cl. 214—140)

Our invention relates to a manure loading device.

An object of our invention is to provide a manure loader which includes members attachable to a standard tractor and which can be raised or lowered from the same.

A further object of our invention is to provide a device of this character which includes separate controlling means for pivoting the manure elevating device as desired and from any position to cause dropping of the load on the same by gravity.

A further object of our invention is to provide braking means associated with the device so that the brake can be applied in any position on the unit.

A further object of our invention is to provide means for powering the arrangement directly from the power take-off on the tractor.

A further object of our invention is to provide a convenient method of controlling the tilting of the manure carrying fork conveniently from the seat of the tractor.

A further object of our invention is to provide a unit of this character which is in fixed position for operation at all times and which can be manufactured simply.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Figure 1:
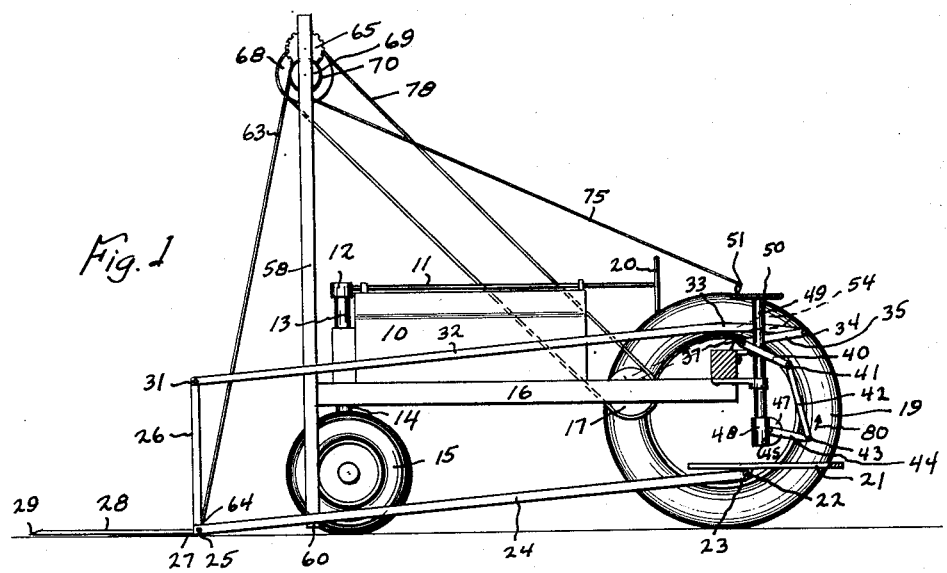
Figure 1 is a side elevation of the arrangement as attached to a tractor.

We have used the character 10 to designate the hood of a standard tractor and the forwardly extending steering rod 11 which is attached to the member 12 which communicates with the member 13 which drives the spindle 14 for turning the front wheels 15. The lower framework of the tractor is indicated by the character 16 with the usual power take-off pulley by the character 17. The rear axle is indicated by the character 18 which is suitably geared to the rear wheels 19. The steering wheel is indicated by the character 20.

Attached to the tractor draw bar 21 is a bracket 22 to which is pivotally attached at 23 a pair of forwardly extending bar members 24. The members 24 extend forwardly with the point 25 to which is pivoted a gathering member which consists of the vertical upright members 26 between which is attached the angled plate member 27 which extends forwardly a slight distance and attached to the member 27 are the forwardly extending tines 28 which terminate in the points 29. The tines 28 are evenly spaced between the members 26 and are rigidly attached to the aforesaid member 27.

A further brace member 30 is attached between the members 26. Pivotally attached at 31 to the upright members 26 are a pair of further members 32 which are parallel to the members 24 and which members 32 extend rearwardly toward the rear of the tractor into the downwardly curved portion 33 and pivotally attached at 34 to the rear end of the members 32 are the spaced levers 35 which are attached at 36 to a shaft 37 which shaft is journalled in the brackets 38, which brackets are attached to the upper portions of the rear axle housing 18.

Attached substantially toward the center of the shaft 37 at 39 is a further rearwardly extending lever 40 which is pivoted at 41 to a further downwardly extending lever 42. Pivotally attached at 43 to the lever 42 is a forwardly extending lever 44 which is solidly attached at 45 to a suitable shaft 46 which passes within the arcuate housing 47. The housing 47 includes a worm gear sector which meshes with a worm which is mounted within the casing 48. The worm within the casing 48 is attached to a steering post 49 which is attached to the horizontally positioned steering wheel 50 to which is attached the small handle 51. Suitable brackets 52 and 53 support the latter arrangement.

The seat of the tractor is indicated by the character 54. Attached at the forward end of the framework 16 of the tractor at 55 are a pair of vertical upright members 56 which pass upwardly and are attached to the top cross bar 57 and a pair of further members 58 are spaced apart from the members 56 and are attached at 59 to the cross bar 57. The members 58 include the outwardly extending portions 60 at the bottom thereof which are adapted to prevent the bars 24 from jamming between the members 58.

Figure 4:
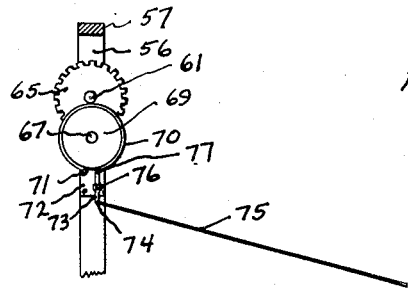
Figure 4 is a detail of the braking mechanism.

Journalled within the members 56 is a shaft 61 to which is attached the reel member 62 upon which is suitably wound the pair of cables 63 which are attached at 64 to the transversely extending plate 27. The shaft 61 extends into the gear 65 which meshes with a smaller gear 66 which is attached to a further shaft 67. The shaft 67 is journalled in the members 56 and is attached to the pulley 68 and at the other extremity to a brake drum 69. The brake drum 69 is enclosed by a brake band 70 which brake band is secured at 71 to a suitable bracket 72 (see Figure 4) which bracket is attached to the member 56.

Figures 2, 3:
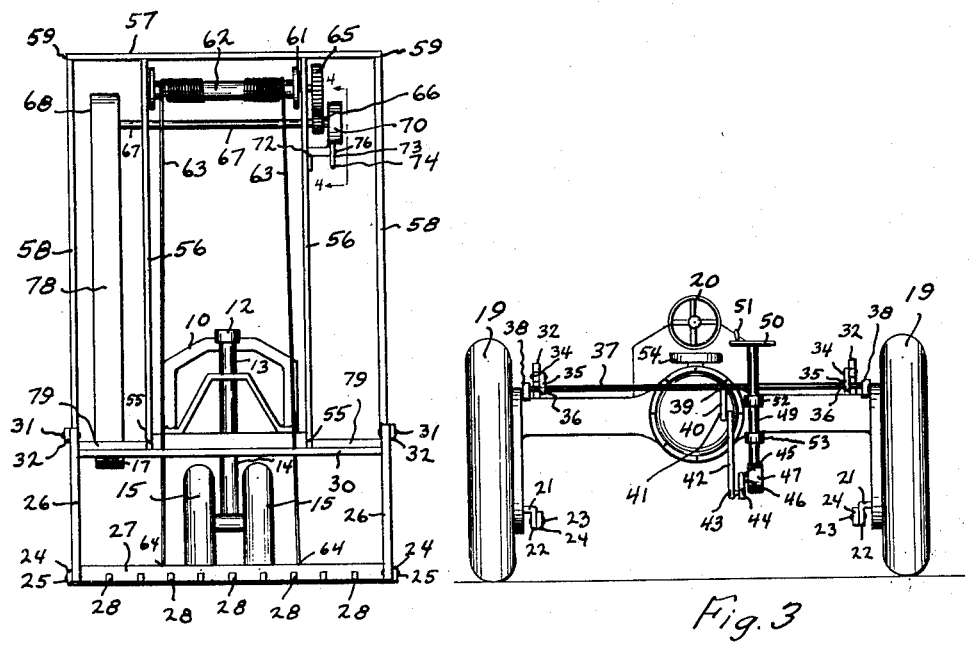
Figure 2 is a forward view of the same.
Figure 3 is a rear view.

Attached to the lever 73 at 74 is the cable 75 which passes rearwardly to the driver of the tractor. The lever 73 is suitably pivoted at 76 and the upper end of the lever 73 is pivoted at 77 to the brake band 70. A drive belt 78 passes over the power take-off pulley 17 and over the upper pulley 68. A pair of further braces 79 (see Figure 2) are attached across the lower ends of the members 56 and 58 to help brace the same.

Now that the structure of our invention has been explained, we shall explain the operation thereof.

It will be observed that the tractor can be driven with the entire arrangement in working position and at the first portion of the operation as shown in Figure 1, the tractor is driven forwardly and the tines 28 which are horizontally positioned can be driven into the manure and below the same at the ground level. The pulley 17 is then operated through the usual clutch means which causes the upper pulley 68 to be rotated due to the connection through the belt 78. This drives the shaft 67 which in turn through the enmeshment of the gears 66 and 65 drives the shaft 61 which causes the cables 63 to be reeled upon the reel member 62.

The gathering member comprising the tines 28 etc. is then elevated up to a point substantially near the reel 62. As the gathering member is elevated, the members 24 and 32 are likewise pivoted upwardly and it is then necessary to trip the gathering member to release the manure off of the tines 28. This is accomplished by turning the wheel 50 through the agency of the handle 51. By turning the wheel 50, the steering post 49 is rotated which rotates the worm in the casing 48 which correspondingly causes the worm gear at 47 to rotate and in turn swings the lever 44 in the direction of the arrow 80.

This forces the lever 42 upwardly which through pivotal engagement at 41 with the lever 40, which lever 40 is attached to the shaft 37, causes the shaft 37 to rotate upwardly and at the same time rotates the pair of levers 35. Since the levers 35 are pivotally engaged at 34 with the members 32, the rotation of the levers 35 will cause the members 32 to be thrust forwardly thereby rotating the members 26 about the pivots 25 which swings the tines 28 downwardly and allows the manure to be released on to the top of the stack or at any desired location.

After the load is raised, the brake can be applied by pulling the cable 75. This causes the lever 73 to be swung about the pivot 76 thereof and moves the pivot attached at 77 to the brake band 70. This causes the brake band to be tightened against the brake drum 69 since the other end of the brake band is rigidly attached at 71 to the frame. The tightening of the band against the drum causes locking of the shaft 67 which through the gear arrangement locks the reel member 62 so that as a result, the arrangement can be elevated to any position and locked thereat, and during raising or lowering of the unit the brake can be applied gradually or quickly as desired.

The tines 28 are brought to horizontal position by reverse movement of the wheel 50, and in this manner, any angular positioning of the tines can be effected and through the foregoing reeling structure the gathering member can be elevated to any desired height. As explained heretofore, the outwardly projecting lips 60 which are an integral portion of the member 58 prevent the side bars 24 from passing beneath such members. All of these operations can be readily performed from the rear seat 54, which is indicated in dotted lines in Figure 1 to prevent confusion, since the wheel 50 is directly adjacent thereto.

Figure 5:
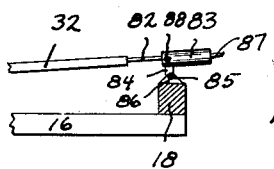
Figure 5 is a modification.
Figure 6:
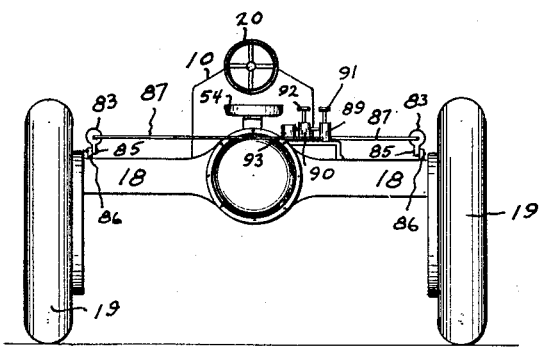
Figure 6 is a rear view of the tractor showing the mounting of the hydraulic modification shown in Figure 5.

A further modification is shown in Figure 5 wherein the upper bars 32 are attached to rods 82 which rods are attached within pistons engaged within hydraulic cylinders 83. The cylinders 83 are attached to a bracket 84 which is pivoted at 85 to a further bracket 86 which is attached to the rear axle housing which is indicated generally as explained by the character 18. Communicating with the cylinders 83 are the pipes 87 which pass to the rear of the cylinders 83 and further pipes 88 which pass to the forward ends of the cylinders 83. The pipes 87 are connected to cylinders 89 and the further pipe 88 to the cylinders 90 which cylinders include suitable pistons attached to the handles 91 and 92. An auxiliary oil tank is indicated by the character 93. Through the foregoing arrangement, the pressure can be applied either rearwardly to the cylinders 83 or forwardly thereby correspondingly forcing the bars 32 forwardly or rearwardly so that as a result, the same pivoting can be applied to the bars 32 to raise or lower the tines 28 without the necessity of apparatus of steering post etc. as explained heretofore. This arrangement works on hydraulic principles and the application of pressure through the handles 91 and 92 will correspondingly cause cooperative action to the bars 32.

It will now be seen that we have provided a manure loader which can be attached to a standard tractor, which can be raised or lowered from the same, which can be held in any elevated position and which can be powered directly from the power take-off of the tractor, which can be utilized in any position and which can be manufactured at a simple cost.

Some changes may be made in the construction and arrangement of the parts of our invention without departing from the real spirit and purpose of our invention, and it is our intention to cover by our claims any modified forms of structure or use of mechanical equivalents, which may be reasonably included within their scope.

We claim as our invention:

1. A manure loading device for tractors comprising a pair of forwardly extending bars pivotally attached to a tractor rear draw-bar, a forward gathering arrangement pivotally attached to said forwardly extending bars, means for tilting said gathering arrangement including a pair of further forwardly extending bars positioned substantially parallel to said lower bars and pivotally attached to the upper end of said gathering member, means for forcing said upper bars forwardly or rearwardly as desired including a rear shaft attached to the tractor, a pair of arms attached to said shaft and pivotally attached at the rear ends of said upper bars, means for swinging said arms including a further arm attached to said shaft, a link member pivotally attached to said further arm, an extension lever pivotally attached to said link member, means for pivotally moving said extension lever.

2. A manure loading device for tractors comprising a pair of forwardly extending bars pivotally attached to a tractor rear draw-bar, a forward gathering arrangement pivotally attached to said forwardly extending bars, means for tilting said gathering arrangement including a pair of further forwardly extending bars positioned substantially parallel to said lower bars and pivotally attached to the upper end of said gathering member, means for forcing said upper bars forwardly or rearwardly as desired including a rear shaft attached to the tractor, a pair of arms attached to said shaft and pivotally attached at the rear ends of said upper bars, means for swinging said arms including a further arm attached to said shaft, a link member pivotally attached to said further arm, an extension lever pivotally attached to said link member, means for pivotally moving said extension lever, means for elevating said gathering member including a pair of forward vertically positioned braces attached to the forward end of the tractor, a reel rotatably journalled between the upper ends of said braces, means for driving said reel.

3. A manure loading device for tractors comprising a pair of forwardly extending bars pivotally attached to a tractor rear draw-bar, a forward gathering arrangement pivotally attached to said forwardly extending bars, means for tilting said gathering arrangement including a pair of further forwardly extending bars positioned substantially parallel to said lower bars and pivotally attached to the upper end of said gathering member, means for forcing said upper bars forwardly or rearwardly as desired including a rear shaft attached to the tractor, a pair of arms attached to said shaft and pivotally attached at the rear ends of said upper bars, means for swinging said arms including a further arm attached to said shaft, a link member pivotally attached to said further arm, an extension lever pivotally attached to said link member, means for pivotally moving said extension lever, means for elevating said gathering member including a pair of forward vertically positioned braces attached to the forward end of the tractor, a reel rotatably journalled between the upper ends of said braces, means for driving said reel, a brake member attached to said reel, means for controlling said brake to lock the gathering arrangement in desired position.

JOHN A. SCHUTTLOFFEL.
EDWARD J. SCHUTTLOFFEL.